Patented Nov. 14, 1922.

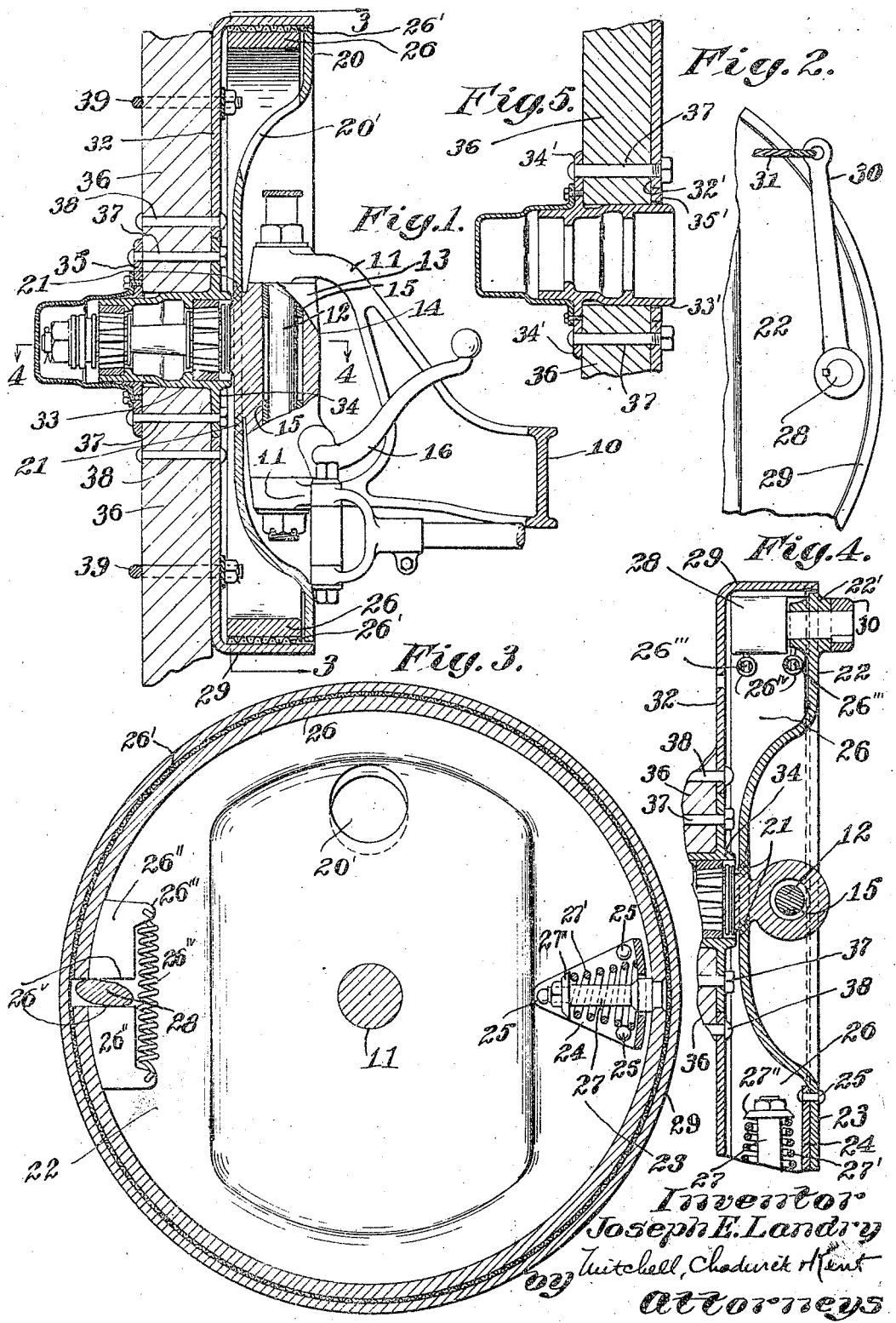

1,435,313

UNITED STATES PATENT OFFICE.

JOSEPH E. LANDRY, OF NEW BEDFORD, MASSACHUSETTS, ASSIGNOR TO LANDRY MANUFACTURING COMPANY, OF NEW BEDFORD, MASSACHUSETTS, A CORPORATION OF MASSACHUSETTS.

BRAKE FOR STEERING WHEEL.

Application filed June 3, 1919. Serial No. 301,482.

*To all whom it may concern:*

Be it known that I, JOSEPH E. LANDRY, a citizen of the United States, residing at New Bedford, in the county of Bristol and State of Massachusetts, have invented certain new and useful Improvements in Brakes for Steering Wheels, of which the following is a specification.

This invention relates to improvements in brakes for steering wheels. More particularly it relates to devices by which brakes and steering appliances may be associated on the front wheels of vehicles. The utility of applying brakes to the four wheels of an automobile simultaneously has long been recognized by a few; but by far the greater number of automobiles in existence at the present day are of the type in which the steering is accomplished by turning brakeless front wheels, swiveled on a vertical pin or knuckle close to the wheel. It is an object of the present invention to provide ns for improving such existing cars by ..ing thereto brakes on the front wheels. The problem is complicated by the fact that the steering knuckle is ordinarily set as close to the wheel as is reasonably possible; that the brake elements have to be in the same plane or zone as the knuckle; that such wheels ordinarily have been designed without provision for holding any brake band or brake, or brake operating means, which moreover cannot be on the axle-tree because of the swivel; and that the brake is liable to have a large part of the momentum of the car thrown suddenly upon it, so that it is essential that its supports be both large and strong. It is a further object to provide, in the case of an existing car, for the use of as many of its own parts as possible, without the necessity of substituting fresh parts in changing the car into the type which has a brake for each wheel. To accomplish these objects, I change the shape of the swiveled axle so that it has, as an integral part, a thin flaring plate which springs outward from it around its entire circumference, somewhat in the nature of a flange, between the axle head and the inner bearing of the wheel; and on this thin flare I mount a brake band and its operating means in the same z ne with, and surrounding, the steering knuckle; and on the wheel I mount a brake drum co-operating therewith and occupying the same zone. If necessary to get the very slight space needed for this, I may cut off the inner end of the hub of the wheel, thus exposing a narrow space of axle which ordinarily is covered and carries or bears against a felt ring as a dust guard. To this narrow space, however found or obtained, I weld annularly a disk of sheet metal, which thus becomes an integral part of the axle. This disk may be a foot or more in diameter, and extends in general perpendicularity to the axis of the axle. The outer portions of this disk are bent out of a true plane, perpendicular to the axle, so that the disk is somewhat dished and occupies space surrounding the adjacent steering knuckle. Thus its edge is far enough away from the adjacent wheel to support a brake band.

On the side of the adjacent wheel a brake drum is readily supported by bolts existing between the wheel spokes. Thus both drum and brake band turn on the steering knuckle respectively with the wheel and with the axle. At the same time the circumferential continuity of the web of metal supporting the brake band, its dished shape, and the adhesion of this disk to the axle around the whole circumference thereof, give very superior strength and rigidity and make the connection so strong that the brake can with safety be applied powerfully. As an illustration, one embodiment of the invention is hereinafter described in detail. It is intended that the patent shall cover, by suitable expression in the appended claims, whatever features of patentable novelty exist in the invention disclosed.

In the drawings:

Figure 1 is an elevation in medial section along the line of the axle but showing the axle and bearings uncut;

Figure 2 is a side elevation of a fragment showing the brake setting lever;

Figure 3 is a side elevation in section on the line 3—3 of Figure 1;

Figure 4 is a plan in section on the line 4—4 of Figure 1; and

Figure 5 is an elevation corresponding to Figure 1 of a fragment of a modification.

Referring to the drawings, 10 indicates the axletree of an automobile on which the steering wheels are mounted, which is ordinary present day practice is the front axletree. This is represented as having a fork at its end consisting of the two members marked 11, which enclose between them a swivel pin 12 and the head 13 of the axle 14. The latter has bearings 15 for the wheel, and has an arm 16 projecting on its inner side, obliquely forward or backward, by which the axle and wheel are turned for the purpose of steering the car. These parts are typical of any ordinary construction to which the invention may be applied as will now be described.

A disk 20, having been preliminarily formed into required shape and provided with an opening at its center of suitable size, is slipped over the axle to the stout part thereof between the inner wheel bearing and the part of the axle herein called the head which is enlarged and elongated particularly to receive the swivel pin of the steering knuckle. Being so located, it may be welded to the axle on a circle passing all the way around the axle as at 21, by the electric crayon or liquid process, by which both axle and disk become liquid, and mingle with liquid steel from the electric crayon to make one integral piece of the axle and disk, with the disk springing out from the axle along a zone which is narrow but in which every part reinforces every other part, against circumferential stresses, so that in the result the resistance to rotative separation is very strong. The shape of this disk 20 is such that it extends radially outward from the axle being, if preferred, and indeed preferably, bent somewhat toward the axletree. However, it is not thus bent enough to touch the ends 11 of the fork of the axletree; and at its greater radial dimensions it is turned still further toward the axletree so that it crosses the zone surrounding this knuckle and, in ordinary instances, may terminate in a plane which is approximately tangent to the inner part of the steering knuckle. A hole 20' may be provided in the upper part of this disk 20, to permit the insertion and removal of the pin of the steering knuckle, but otherwise the disk 20 should be a complete web, and approximately circular. However, its forward segment and its rear segment are preferably pressed or flattened into its inmost plane, by which is meant the plane furthest removed from the bearings of the wheel. If the disk have a diameter of approximately 15 inches the forward and rear segments thus flattened, marked respectively 22 and 23, may have each an altitude of 2½ inches. To the rear said segment 23 is secured an angle plate 24, arranged with one of its portions flat against the segment 23 and illustrated as being fastened by rivets 25; and with its other or angle portion projecting perpendicularly therefrom, parallel to the axle and toward the outer side of the wheel, and  ing fastenings of any suitable sort to hold the brake band 26. This brake band is represented as being of any ordinary expanding type, anchored by the shaft 27 in the middle of its length, which length constitutes a nearly complete circumference, and hanging free at its two ends which are at semi-circumferential distance from its said point of anchorage.

The shaft, which has a head engaging on the outer side of the brake band, penetrates that band, passes loosely through the angle plate, and on the other side thereof has strung upon it a spiral compression spring 27' which, engaging a collar 27'' and nut on the shaft, tends to push the shaft and that part of the brake band with which its head is in engagement inward from the adjacent brake drum 29, so that the middle of the brake band and its lining 26' are normally clear of the brake drum, as is usual. The two ends of the brake band, a half circumference removed from the point last mentioned, are in effect greatly thickened so as to be engaged by a cam to set the brake. This is illustrated as being done by the addition to each of a piece of sheet metal 26'' bent around the edges of the end of the band and secured thereto in any suitable manner. These have ears 26''' between which springs 26$^{iv}$ may be hooked, tending to draw these two ends of the brake band together, out of contact with the brake drum 29; and they have faces 26$^v$ between which is a cam 28, adapted, upon being turned, to separate these faces and thus to drive the whole band into contact with the surrounding drum. The spring 27' then yields, and uniform contact of the brake lining with the interior of the brake drum 29 results. The cam pin 28 is conveniently and securely journalled in a boss 22' on the bent segment 22 of the disk 20, and projects thence, in parallelism with the axle, to between the two ends of the brake band, and also into engagement with an operating part. The latter may be an arm 30 of any usual or suitable type, which in the embodiment of the invention illustrated is shown attached to a cord 31 which when pulled causes the pin 28 to turn in boss 22' and so sets the brake by spreading the brake band into contact with the internal surface of the brake drum 29. The drum consists of a cylindrical band of suitable diameter to be thus engaged by the brake band, and is supported from the spokes of the wheel. For such support the band portion is made integral with a disk portion 32 of sheet metal which may be secured to the wheel by any suitable means. In the type of wheel illustrated in Figure 1, the metallic hub 33 of the wheel has integral with it a flange 34 on the inner side of the wheel against which the spokes 36 are clamped by bolts 37 and a removable disk 35 on the outer side of the wheel. In such a case the disk portion 32 of the brake drum may be set against the spokes in the same plane with the flange 34 of the hub; and the latter may be turned, if necessary, to a certain diameter equalling the diameter of hole through the inside of the disk 32 of the brake drum, so that the drum disk will just fit over the hub flange, thus centring the drum disk; and the drum disk may then be secured to the wheel by any suitable means, which in Figure 1 are indicated as being rivets 38 each penetrating a spoke and clips 39 each embracing a spoke. In any case in which the integral flange of the hub 33' is on the outer side of the wheel, as in Figure 5, at 34' and the removabl flange 35' is on the inner side, the brake drum disk 32' may be fitted directly over the hub itself, or over a turned down remnant of the flange as indicated in Figure 5. In that case, the same bolts 37 which originally held the spokes may be used.

By the arrangement thus made, the brake drum 29 is secure on the wheel and rotates with it; the disk 20 is circularly secure on the axle and swivels with it in steering; and the brake band 26 is anchored on the disk 20 and supported in operative position by the cam 28 and the angle plate 24, so that when the cam spreads the brake band a strong frictional drag is imposed by the axle on the wheel, which friction is uniform for all settings of the axle about its swivel to the axletree.

The arrangement thus made is both simple, secure and compact. It does not interfere with the supporting or turning of the car wheel upon the steering knuckle originally designed for it. As it is itself a web, it in large measure protects that knuckle and the oil or grease arrangements thereof from mud and dust, because it surrounds it on all sides but one. It is customarily thought necessary to protect the wheel bearing on the axle by one or more felt washers, but as the brake-supporting-disk 20 of the invention reduces the need for such protection, space heretofore occupied by such washers can be utilized for the attachment of this disk 20 to the axle. Because of the practically universal presence of such felt washers the invention is applicable to practically all existing types of cars. Owing to the web form of the disk 20, the supports of the brake band are rigidly held in true alignment in perpendicularity to the axle; and owing to the broad and solid fastening of the brake drum the latter is equally securely held on the wheel, so that a simple expansion of the brake band causes a uniform and proper application of the brake. Although the idea is illustrated only as it may be applied to an expanding brake, it is obvious that the invention is not limited to that.

I claim as my invention :—

1. The combination, with an axle having a head pivoted in a steering knuckle of a vehicle wheel, of a perforated disk secured to the axle the place of attachment being between the wheel and the pivoted head, and the attached surface being the wall of the perforation, comprising the thickness of the disk; and a brake supported on said disk.

2. The combination, with an axle having a head pivoted in a steering knuckle of a vehicle wheel, of a disk secured to the axle its place of attachment being between the wheel and pivoted head, its diameter exceeding the height of the steering knuckle, and its outer portion being dished from the wheel side of the head toward the axletree side thereof, whereby it surrounds the knuckle in the general vertical plane of said knuckle; and a brake supported on said disk.

3. The combination, with an axle having a head pivoted in a steering knuckle of a vehicle wheel, of a disk secured to the axle between the wheel and the pivoted head, having a segmental portion projecting further toward the axletree side of said head than do other parts of the disk, whereby the knuckle is substantially within the parallel vertical planes which bound the disk, and means supported on said segmental portion for anchoring the brake.

4. The combination, with an axle having a head pivoted in a steering knuckle of a vehicle wheel, of a disk secured to the axle between the wheel and the pivoted head, having a segmental portion whose chord is approximately parallel to the axis of the pivoted head, projecting further toward the axletree side of said head than do other parts of the disk, and means horizontally penetrating and supported on said segmental portion for actuating the brake.

5. The combination, with an axle having a head pivoted in a steering knuckle of a vehicle wheel, of a disk secured to the axle on the wheel side of the pivoted head extending toward the axletree side thereof and there having two diametrically opposite segmental portions approximately flattened into the same plane on the axletree side of the knuckle axis; and means on one of these portions for anchoring and on the other for actuating the brake.

6. The combination, with an axle having a head pivoted in a steering knuckle of a vehicle wheel, of a disk secured to the axle between the wheel and the pivoted head, extending toward the axletree side thereof and there having two diametrically opposite segmental portions approximately flattened into the same plane; and an angle plate, returning toward the wheel, mounted on one and a cam mounted on the other of these portions, for anchoring and actuating the brake.

7. The combination, with an axle having a head pivoted in a steering knuckle of a vehicle wheel, of a disk, additional to the metal connecting the axle with the pivots of said head, made integral with the axle by welding between the wheel and the pivoted head; and having a central perforation whereby it surrounds a cylindrical portion of said metal on a diameter approximating that of the perimeter of the base of the axle, the said disk being made integral with said surrounded portion by being welded to it; and a brake thereby supported on the axle.

8. The process of applying a brake to a complete steering wheel, including axle, axletree, and steering head of the axle pivoted thereon, comprising the enlarging of the axle by making an integral and circular attachment of a disk thereto, on a surface the horizontal diameter of whose curve approximates the horizontal diameter of the steering head by interflux of metal around the axle between the wheel and the steering head, and mechanically securing the brake to the disk at a considerable radial distance from the said place of interflux.

9. A combined axle and brake for a steering wheel, comprising an axle having a horizontal pin whereon the wheel turns, a head wherein is an upright pin, held in the axletree, on which upright pin the axle turns for steering, and a perforated disk attached between the pin and the head, the attachment being on that edge surface of the disk which is toward the axle pin rather than toward the head, and said disk being additional to the metal connecting the axle pin with the head, and supporting a brake for the wheel.

Signed at Boston, Massachusetts, this 29th day of April, 1919.

JOSEPH E. LANDRY.